(12) United States Patent
Wu et al.

(10) Patent No.: US 6,724,937 B1
(45) Date of Patent: Apr. 20, 2004

(54) METHOD OF IDENTIFYING IMAGE FRAMES SUITABLE FOR PRINTING

(75) Inventors: Jing Wu, Carlingford (AU); John Richard Windle, Hebersham (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/334,177

(22) Filed: Jun. 16, 1999

(30) Foreign Application Priority Data

Jun. 19, 1998 (AU) .............................................. PP4246

(51) Int. Cl.[7] .............................. G06K 9/20; G06K 9/62; G06K 9/68; G09G 5/00
(52) U.S. Cl. ........................ 382/190; 382/282; 382/224; 382/218; 345/597; 345/723; 348/263
(58) Field of Search ............................... 382/190, 195, 382/199, 255, 282, 164, 165, 167, 170, 171, 172, 209, 224, 274, 275, 278; 345/620, 625, 631, 597, 723, 600, 601; 348/69, 70, 92, 256, 259, 263, 266

(56) References Cited

U.S. PATENT DOCUMENTS

| | | | |
|---|---|---|---|
| 4,379,632 A | * 4/1983 | Dedden et al. ............. 355/68 |
| 5,576,950 A | 11/1996 | Tonomura et al. ......... 364/514 A |
| 5,875,040 A | * 2/1999 | Matraszek et al. ......... 358/453 |
| 5,903,660 A | * 5/1999 | Huang et al. ............... 382/132 |

* cited by examiner

Primary Examiner—Jayanti K. Patel
Assistant Examiner—Yosef Kassa
(74) Attorney, Agent, or Firm—Fitzpatrick, Cella, Harper & Scinto

(57) ABSTRACT

A method for identifying one or more image frames (100) from a series (104) of video image frames, in order to print, store or flag the selected frames. The method calculates a gradient value for each image frame in a video shot (102) series, identifies one or more gradient value peaks (324) in a corresponding range of a raw data series (302), and selects the image frames (110) corresponding to the identified gradient value peaks. Two types of frames (202, 206) are identified as being suitable for printing. A first type (202) comprises frames with a high gradient content, where the image is sharply defined. A second type of frame (206) also has good focus, but is representative of periods of relative stillness, or lack of motion between consecutive image frames (100) during the video shot series (104).

36 Claims, 7 Drawing Sheets

METHOD OF IDENTIFYING IMAGE FRAMES SUITABLE FOR PRINTING

FIELD OF THE INVENTION

The present invention relates to a method and system for identifying image frames for printing, storing or flagging from a video shot comprising a series of video image frames.

BACKGROUND OF THE INVENTION

Current systems for identifying image frames suitable for printing are based on extraction of frames on the basis of scene changes, colour changes, and/or camera motion. These systems focus on extracting frames which represent different aspects of camera utilisation, or alternatively different scene attributes. U.S. Pat. No. 5,576,950, selects image frames on the basis of scene quality and matching value. A disadvantage of this approach is the high computational load imposed by the algorithms used for assessing image frame quality and matching value.

SUMMARY OF THE INVENTION

It is an object of the present invention to substantially overcome, or at least ameliorate, one or more disadvantages of the prior art.

Therefore the invention discloses a method for identifying one or more image frames from a series of video image frames for printing, storing or flagging, the method including the steps of:

a) calculating a gradient value for each image frame in the series, thereby to generate a raw data series;

b) smoothing data within the raw data series to generate a smoothed data series;

c) identifying one or more local maxima in the smoothed data series;

d) identifying one or more gradient value peaks in a corresponding range of the raw data series based on positions of respective local maxima; and e) selecting the image frames corresponding to each of the identified gradient value peaks.

The invention further discloses a method of identifying one or more image frames from a series of image frames, the method including the steps of:

n) calculating a gradient value for each image frame in the series, thereby to generate a raw data series;

o) defining a gradient value threshold;

p) identifying sets of adjacent gradient values in the raw data series which exceed the gradient value threshold and are of similar value; and q) selecting a representative image frame from each set of adjacent gradient values.

The invention yet further discloses a method for identifying one or more image frames from a series of video image frames suitable for printing, storing or flagging, the method including the steps of:

a) calculating a gradient value for each image frame in the series;

b) obtaining smoothed data based on the gradient value; and c) selecting the image frames on the basis of the smoothed data.

The invention yet further discloses an apparatus for identifying one or more image frames from a series of video image frames for printing, storing or flagging, the apparatus comprising:

gradient calculation means arranged to receive a series of image frames and to calculate and output a raw data series of gradient values, one gradient value for each frame;

data smoothing means responsive to the raw data series and arranged to generate and output a smoothed data series;

identification means responsive to the smoothed data series and arranged to identify and output one or more local maxima in the smoothed data series;

gradient peak selection means responsive to the one or more local maxima and to the raw data series and arranged to identify one or more gradient value peaks in a corresponding range of the raw data series based upon positions of respective local maxima; and image frame selection means responsive to the series of image frames and to the identified gradient value peaks, and arranged to select image frames corresponding to each of the identified gradient value peaks.

The invention yet further discloses an apparatus for identifying one or more image frames from a series of image frames, the apparatus comprising:

means for calculating a gradient value for each image frame in the series, thereby to generate a raw data series;

means for defining a gradient value threshold;

means for identifying sets of adjacent gradient values in the raw data series which exceed the gradient value threshold and are of similar value; and means for selecting a representative image frame from each set of adjacent gradient values.

The invention yet further discloses an apparatus for identifying one or more image frames from a series of video images for printing, storing or flagging, the apparatus comprising:

gradient calculation means arranged to receive a series of image frames and to calculate and output a series of gradient values;

data smoothing means responsive to the series of gradient values for generating a smoothed data series; and image frame selection means responsive to the smoothed data series for selecting image frames.

The invention yet further discloses a computer program product including a computer readable medium having recorded thereon a computer program for identifying one or more image frames from a series of video image frames for printing, storing or flagging, the computer program comprising:

gradient calculation process steps arranged to receive a series of image frames and to calculate and output a raw data series of gradient values, one gradient value for each frame;

data smoothing process steps responsive to the raw data series and arranged to generate and output a smoothed data series;

identification process steps responsive to the smoothed data series and arranged to identify and output one or more local maxima in the smoothed data series;

gradient peak selection process steps responsive to the one or more local maxima and to the raw data series and arranged to identify one or more gradient value peaks in a corresponding range of the raw data series based upon positions of respective local maxima; and image frame selection process steps responsive to the series of image frames and to the identified gradient value peaks, and arranged to select image frames corresponding to each of the identified gradient value peaks.

The invention yet further discloses a computer program product including a computer readable medium having recorded thereon a computer program for identifying one or more image frames from a series of video image frames for printing, storing or flagging, the computer program comprising:

process steps for calculating a gradient value for each image frame in the series, thereby to generate a raw data series;

process steps for defining a gradient value threshold;

process steps for identifying sets of adjacent gradient values in the raw data series which exceed the gradient value threshold and are of similar value; and process steps for selecting a representative image frame from each set of adjacent gradient values.

BRIEF DESCRIPTIONS OF THE DRAWINGS

Preferred embodiments of the invention will now be described, by way of example only, with reference to the drawings, in which.

DETAILED DESCRIPTION

In the context of this specification, the word "comprising" means "including principally, but not necessarily solely" or "having" or "including" and not "consisting only of". Variations of the word comprising, such as "comprise" and "comprises" have corresponding meanings.

Figure 1:
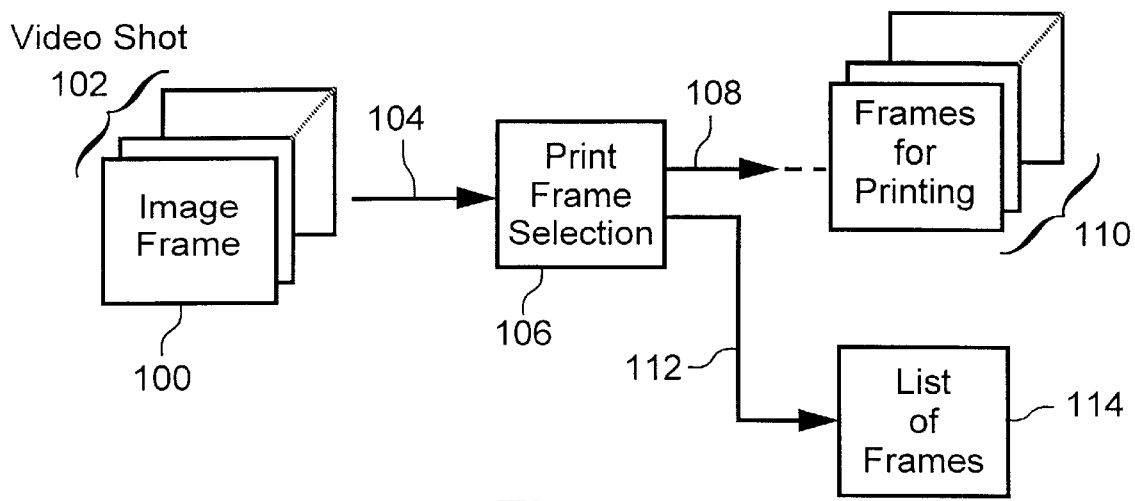
FIG. 1 is a schematic block diagram of a method of identifying one or more image frames from a series thereof, according to the invention.

Referring to the drawings, FIG. 1 shows a block diagram of a system for extracting frames 110 suitable for printing. A series 104 of individual image frames 100 which together comprise a video shot 102 are processed by a print frame selection block 106. The print frame selection block 106 produces a series 108 of the image frames 110 suitable for printing derived from the video shot 102, and/or a frame list 114 of the image frames suitable for printing. The method lends itself to automation, enabling identification of frames 110 most likely to be suitable for printing from the video shot 102.

Figure 2:
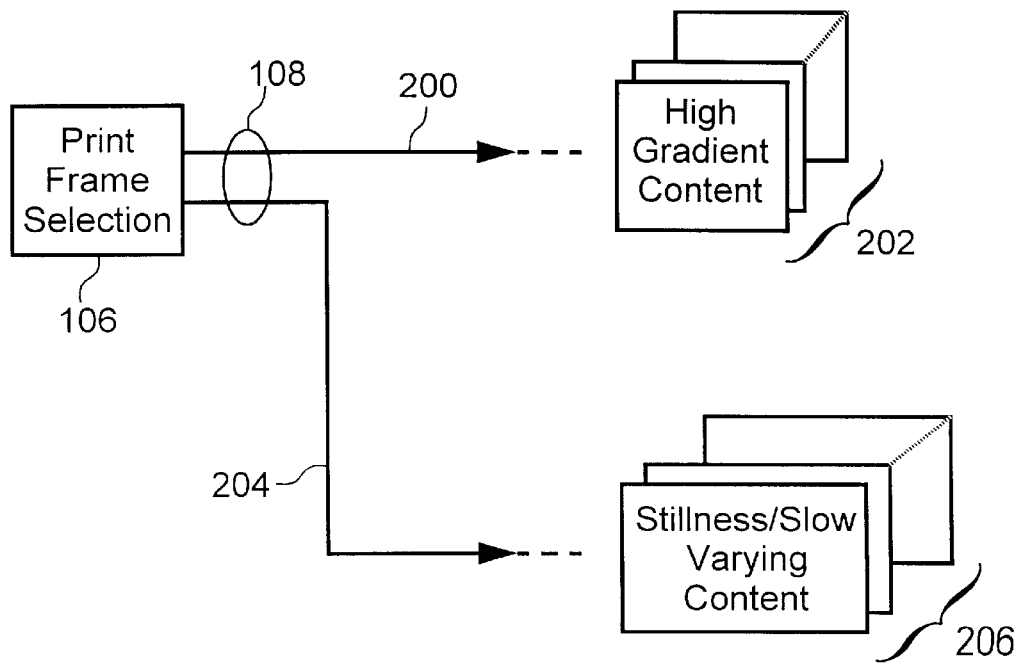
FIG. 2 illustrates broad categories of print frames produced thereby.

FIG. 2 shows that the print frame selection block 106 produces two types of frames (202, 206) suitable for printing. A first type 202 comprises frames with a high gradient content, which generally exhibit many edges in the image, and where the image displays a relatively high degree of focus (i.e., is sharply defined). A second type of frame 206 also preferably has good focus and a relatively high number of edges, but more importantly is representative of periods of relative stillness, or lack of motion between consecutive image frames 100 during the video shot series 104.

Figure 3A:
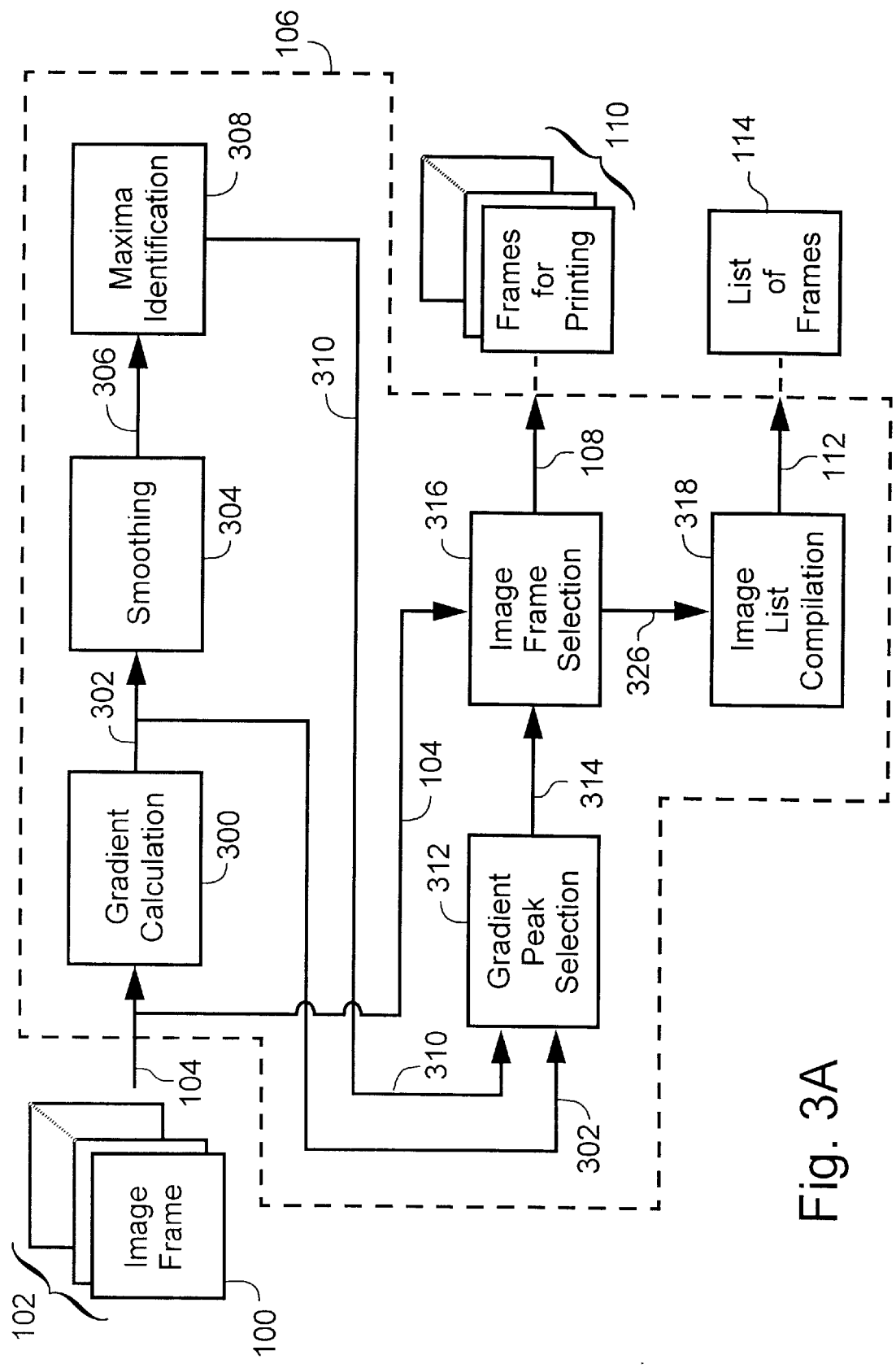
FIGS. 3A and 3B show a functional block diagram of a preferred embodiment of the invention and a representation of data extracted therefrom respectively.
Figure 3B:
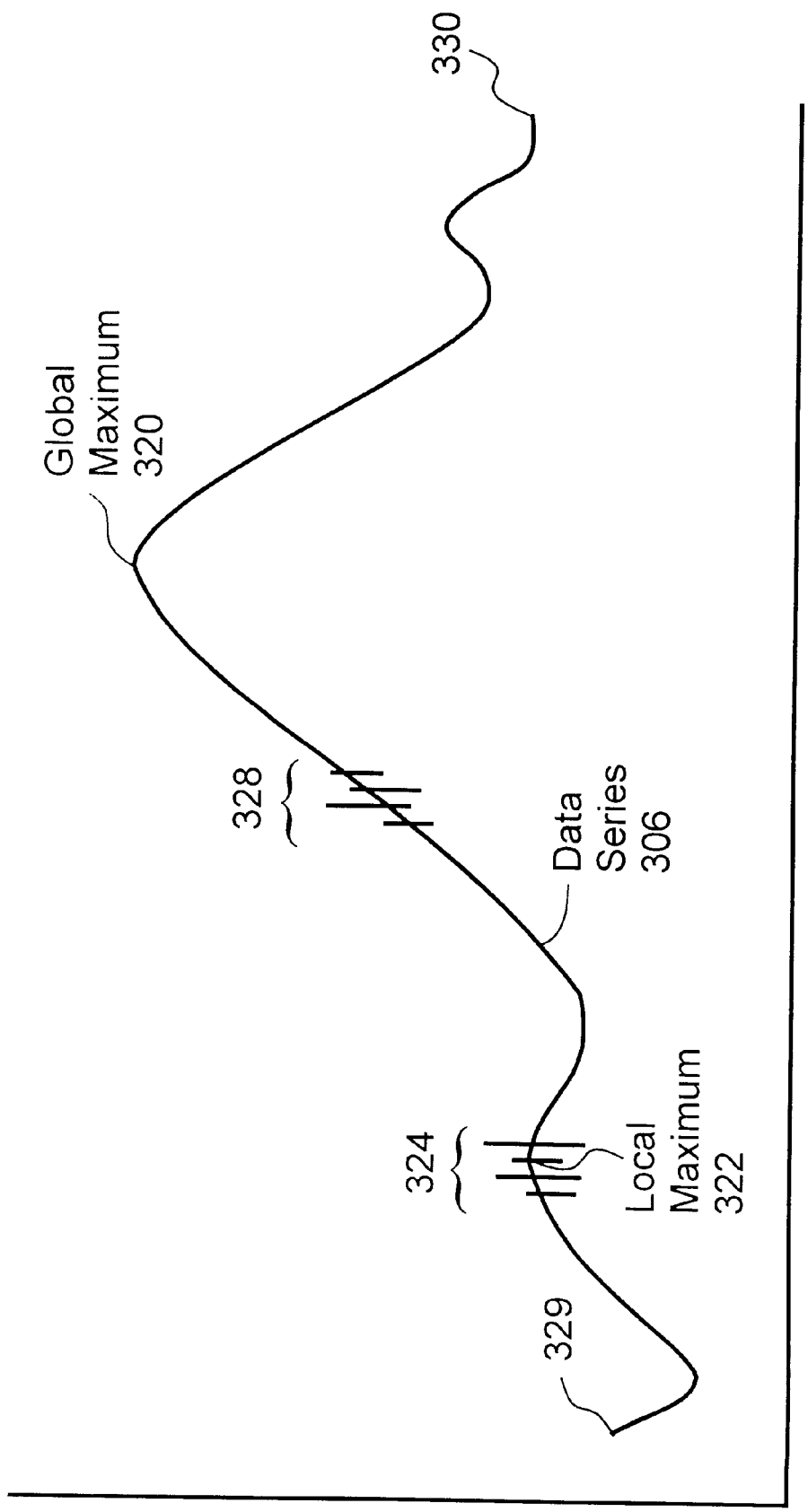

FIGS. 3A and 3B illustrate the process for identifying the first type of frame 202. FIG. 3A shows how the video shot series 104 is processed in a gradient calculation block 300 in order to extract a gradient value for each image frame 100 in the video shot series 104. Details concerning gradient value, including a preferred method of obtaining it, are discussed below. This series of gradient values 302 forms a raw data series which is passed through a smoothing process 304, which produces a smoothed data series 306 from which local maxima are identified in a maxima identification block 308. FIG. 3B shows pictorially how the smoothed data series 306 will generally have a global maximum 320 and other local maxima for example 322. For the purposes of the preferred embodiment, each of the maxima can be treated as a local maximum. Once local maxima have been identified in the maxima identification block 308, gradient value peaks in the raw data series 302 are selected in a gradient peak selection block 312. A series of peaks selected 314 are chosen based on the positions of respective local maxima as output 310 from the maxima identification block 308.

FIG. 3B shows how gradient value peaks 324 in the raw data series 302 can be associated with a local maximum 322 in the smoothed data series 306. Alternatively, the figure shows how gradient value peaks 328 in the raw data series 302 can correspond to the smooth data series 306 between adjacent maxima 322 and 320. Image frames corresponding to these peaks are selected in an image frame selection block 316, and are available as frames 110 suitable for printing. Alternatively or in addition, a listing 114 of the selected image frames is compiled in a list compilation block 318 producing a summary list 114.

Figure 4:
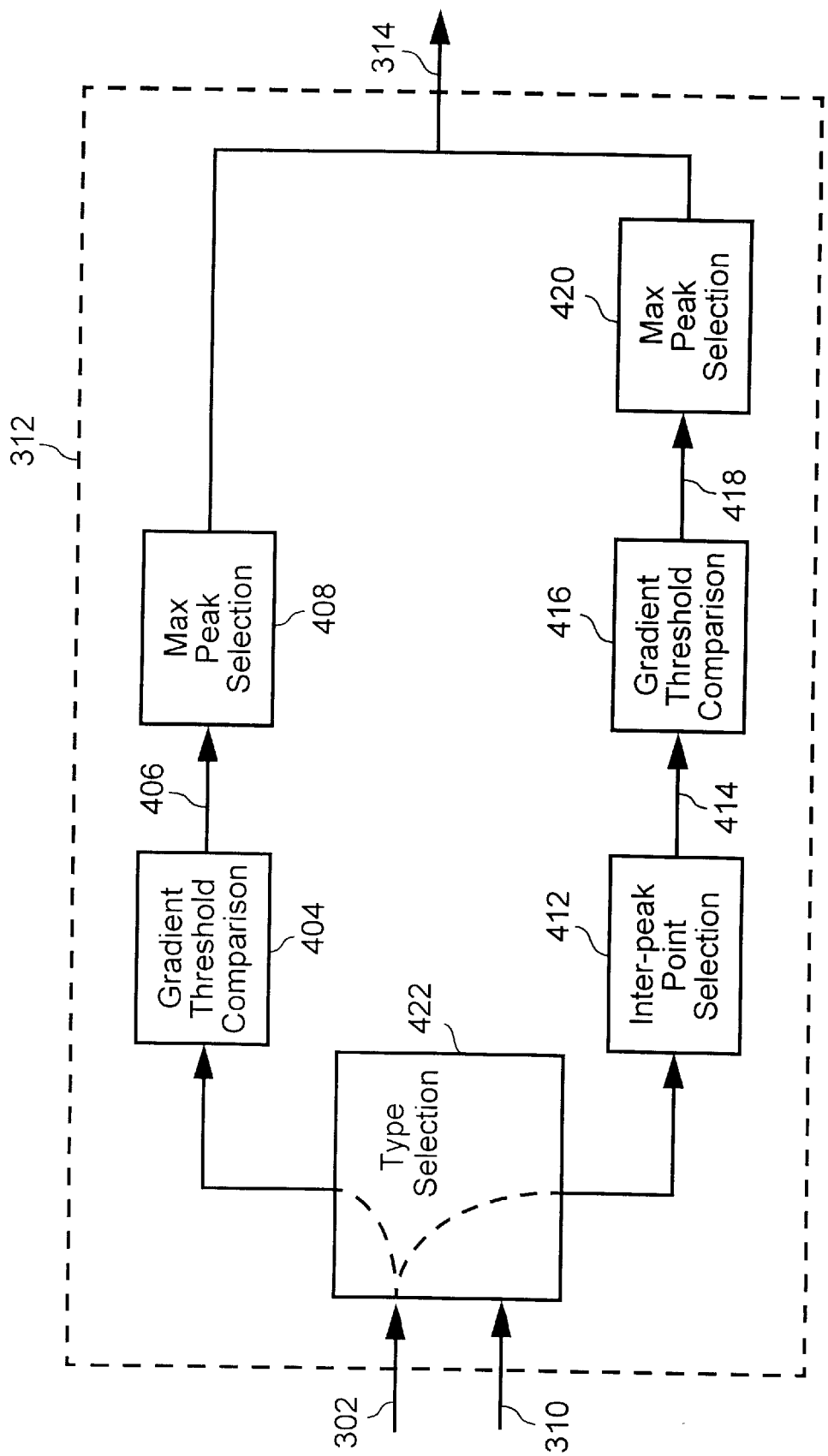
FIG. 4 is a functional block diagram showing in detail a sub-step of the embodiment of FIG. 1, for two cases of local maximum separation.

FIG. 4 provides details of the gradient peak selection block 312 and shows how the identification of local maxima by the maxima identification block 308 in the smoothed data series 306 can result in at least one of two situations. The first of these, is where adjacent local maxima are remote from each other in the smoothed data series 306, whilst the second is where adjacent local maxima are relatively close to each other in the smoothed data series 306. Where adjacent local maxima are relatively close to each other, as determined by a type selection block 422, then the raw data series 302 is directed to a gradient threshold comparison block 404. In the block 404, each set of identified peaks in the raw data series 302 which are in the vicinity of each local maximum 322 as determined by the maxima identification block 308, are compared to a gradient threshold. Providing that at least one peak in the set exceeds the gradient threshold value, the maximum peak in the set is selected by a maximum peak selection block 408 as being representative of the local maximum, suitable for printing and the selected peak is output on a line 314. Where adjacent local maxima are relatively remote from each other in the smoothed data series 306, as determined by the type selection block 422, then the raw data series 302 is directed to an inter-peak point selection block 412. In this block 412, points are selected between the adjacent local maxima in the smoothed data series 306. Selection of these points may be based on predetermined increments in time or on some characteristic of the smoothed data series 306 such as a rate of change of the series 306. Providing that at least one peak in each set of peaks in the raw data series 302 in the vicinity of each selected point selected by the inter-peak selection block 412 exceeds a gradient threshold, as determined by a gradient threshold comparison block 416, the maximum peak in the set is selected by maximum peak selector block 420 as representative, suitable for printing and is output on the line 314. Preferably, at end points 329 and 330 of the smoothed data series 306 a higher gradient threshold value is used in the comparison block 416 than the gradient threshold values used between the end points. The higher threshold value can be a predetermined constant, or alternatively it can be determined dynamically based on the slope of the smoothed data series 306 curve and a nearest local maxima at a respective endpoint. Where a local maxima is relatively remote from its adjacent local maxima and the value of the smoothed data series 306 varies smoothly between these maxima, this generally represents slow camera work such as pan, tilt or zoom.

Figure 5:
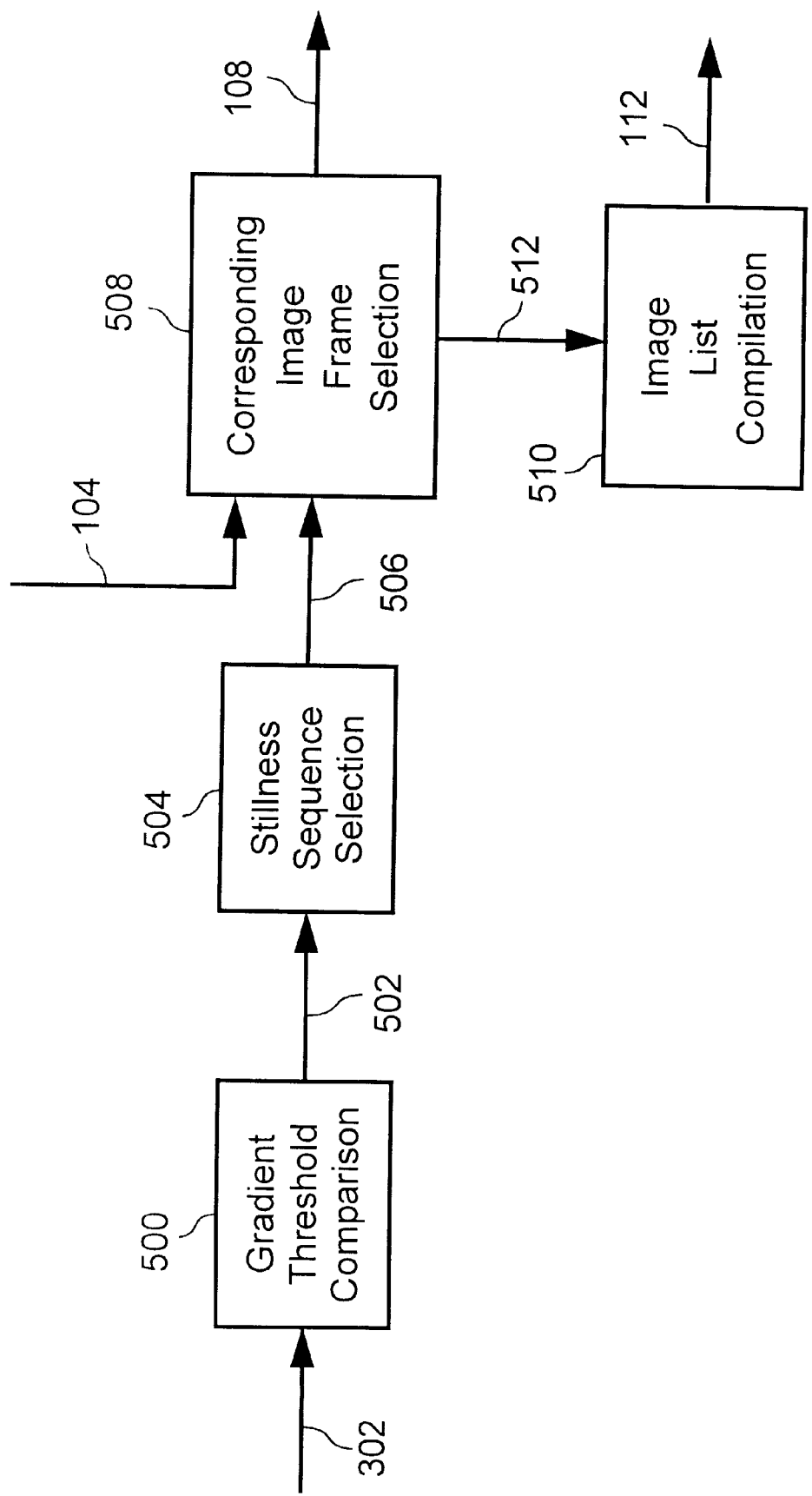
FIG. 5 is a functional block diagram showing in detail an alternate sub-step of the embodiment of FIG. 1, for stillness based frames.

FIG. 5 shows in detail an alternate process in the embodiment of FIG. 1, for stillness based image frames. Gradient values for image frames 100 in the raw data series 302 are first compared to a gradient value threshold in a threshold comparison block 500. Gradient values which exceed the threshold are compared with adjacent gradient values which also exceed the threshold in a stillness sequence selection block 504. Where a plurality of adjacent gradient values both exceed the gradient threshold and are of substantially similar amplitudes, a representative gradient value is selected from the plurality by the stillness sequence selection block 504, and output on a line 506. A corresponding image frame is selected by a corresponding image frame selection block 508 from the video shot series 104. The selected image frame is output on a line 108 as suitable for printing. Alternatively, or in addition, a frame list 114 is compiled by a frame list compilation block 510 and is output on line 112. These image frames 110 selected for printing have high gradient values (which indicate relatively good focus and a large number of edges) but more importantly are representative of relatively still periods in the video shot 102.

Figure 6:
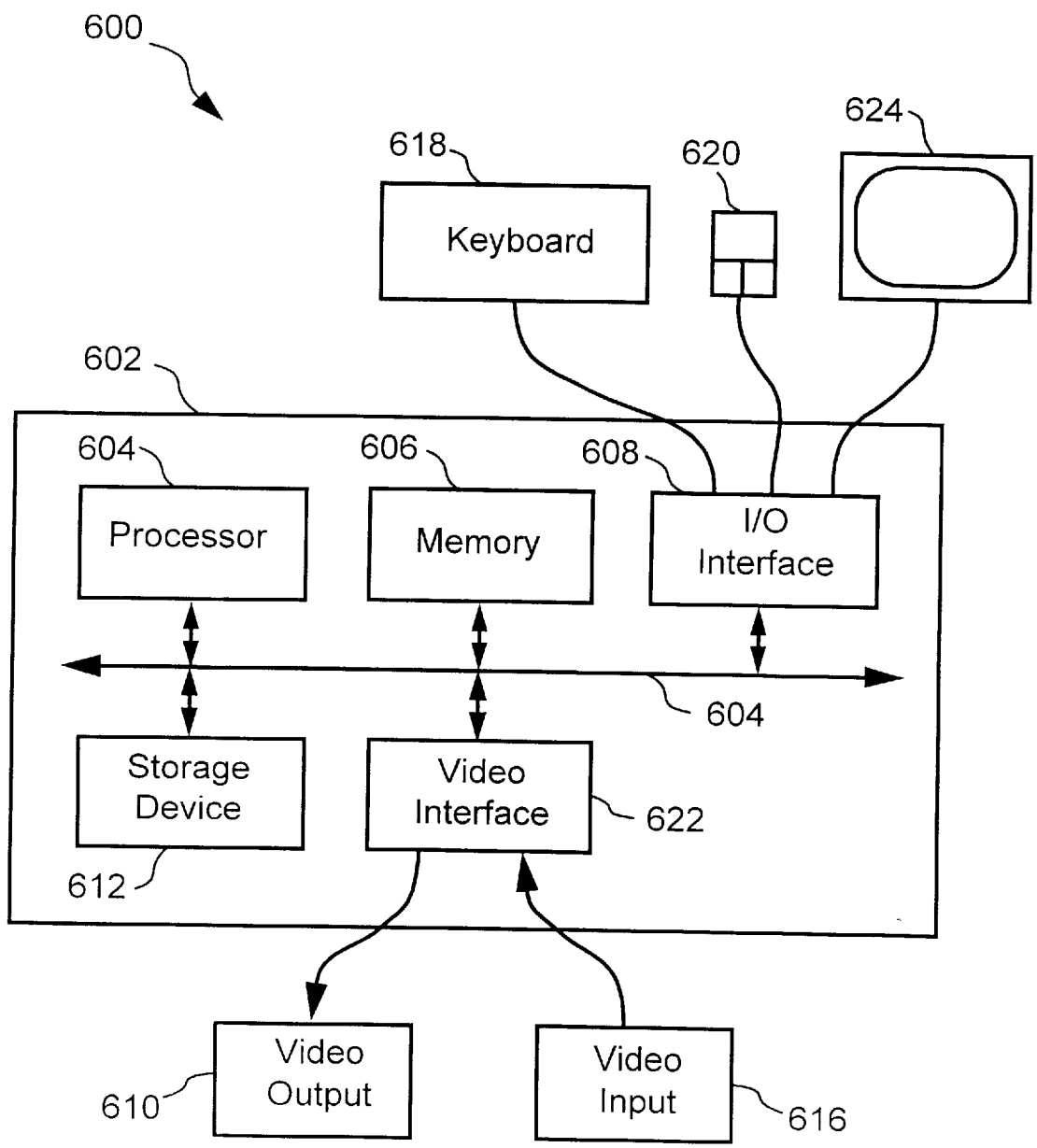
FIG. 6 is a schematic block diagram of a general purpose computer upon which the preferred embodiment of the present invention can be practiced.

FIG. 6 shows how the system can preferably be practised using a conventional general-purpose computer 600 wherein the various processes described may be implemented as software executing on the computer 600. In particular, the various process steps are effected by instructions in the software that are carried out by the computer 600. The software may be stored in a computer readable medium, is loaded onto the computer 600 from the medium, and then executed by the computer 600. The use of the computer program product in the computer preferably effects an apparatus for identifying image frames for printing, storing or flagging from a video shot comprising a series of video image frames. Corresponding systems upon which the above method steps may be practised may be implemented as described by software executing on the above mentioned general-purpose computer 600. The computer system 600 includes a computer module 602, a video input card 616, and input devices 618,620. In addition, the computer system 600 can have any of a number of other output devices including a video output card 610 and output display 624. The computer system 600 can be connected to one or more other computers using an appropriate communication channel such as a modem communications path, a computer network, or the like. The computer network may include a local area network (LAN), a wide area network (WAN), an Intranet, and/or Internet. Thus, for example, video shots 102 may be input via video input card 616, control commands may be input via keyboard 618, desired frames for printing 202,206 may be output via video output card 610 and frame lists 114 may be output via display device 624. The computer 602 itself includes a central processing unit(s) (simply referred to as a processor hereinafter) 604, a memory 606 which may include random access memory (RAM) and read-only memory (ROM), an input/output (10) interface 608, a video input interface 622, and one or more storage devices generally represented by a block 612. The storage device(s) 612 can include one or more of the following: a floppy disk, a hard disk drive, a magneto-optical disk drive, CD-ROM, magnetic tape or any other of a number of non-volatile storage devices well known to those skilled in the art. Each of the components 604, 606, 608, 612 and 622, is typically connected to one or more of the other devices via a bus 604 that in turn can include data, address, and control buses. The video interface 622 is connected to the video input 616 and video output 610 cards, and provides video input from the video input card 616 to the computer 602 and from the computer 602 to the video output card 610.

The method of gradient value calculation used in the present embodiment utilises the sum of the magnitudes of the R (red), G (green) and B (blue) gradients in the horizontal and vertical directions for each pixel. Calculation of the gradient uses the following operators:

$$Ox = \begin{pmatrix} -1 & 0 & 1 \\ -1 & 0 & 1 \\ -1 & 0 & 1 \end{pmatrix}$$

$$Oy = \begin{pmatrix} 1 & 1 & 1 \\ 0 & 0 & 0 \\ -1 & -1 & -1 \end{pmatrix}$$

where:

Ox and Oy are known in the art as Prewitt operators.

The gradient value in the horizontal direction for each colour component is found by convolving the image, pixel by pixel, with Ox. The vertical gradient value is found by similarly convolving each pixel with Oy. Considering only the R component of the image (which is denoted by r):

$$Gr = |Ox * r| + |Oy * r|$$

where:

Gr is the aggregate gradient value for R for a given pixel, and

\* denotes convolution

Similar operations are performed for G (denoted by "g") and B (denoted by "b") gradients. The composite colour gradient value Gc for each pixel, is then given by:

$$Gc = Gr + Gg + Gb$$

If a threshold Tg is set, the composite colour gradient value for each pixel is described by $$Gc = \begin{cases} Gc & \text{if } Gc > Tg \\ O & \text{if } Gc \leq Tg \end{cases}$$

Finally, the calculated gradient value for the entire frame is given by:

$$G(t) = \sum_i \sum_j Gc / MN$$

where:

M and N are the width and height of the image t is the frame number i=0, 1, 2, ..., N−1 j=0, 1, 2, ..., M−1

Under certain circumstances, it is desirable to extract frames suitable for printing based not upon the contents of entire image frames, but rather upon the content of selected regions within image frames.

Figure 7:
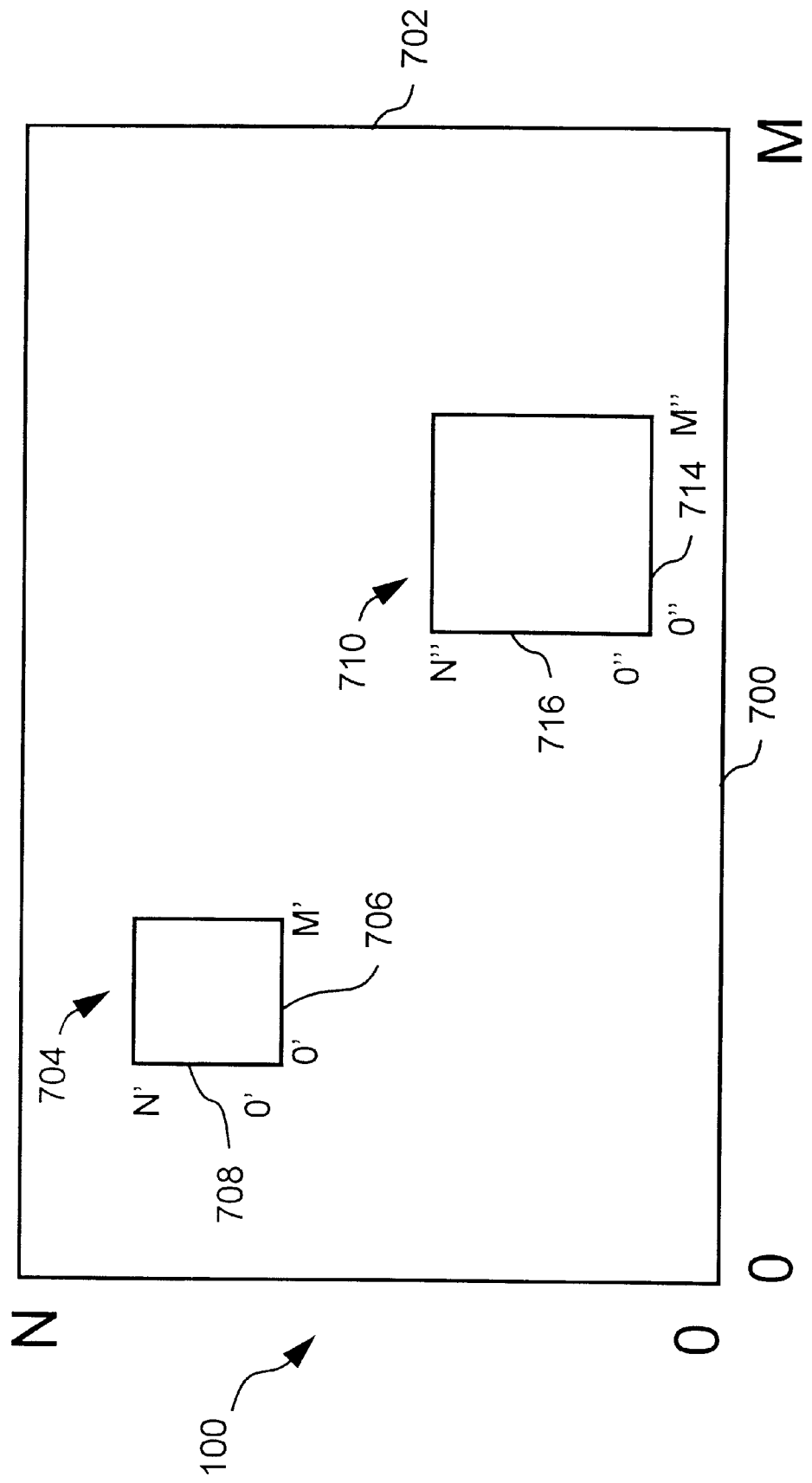
FIG. 7 depicts application of demarcation frames to limit the image region considered.

FIG. 7 depicts an image frame 100 for which a gradient value has been calculated by considering the entire frame 100 over its full width 700 (ie. extending from 0 to M), and its full height 702 (ie. from 0 to N). Consider the situation however, for example, where a video shot has been taken of a racing car. Typically, the video camera will have been panned in order to keep the racing car centered in the camera's field of view as the car moves. In this case, the racing car will be substantially in focus across the various frames of the video shot, whereas the background in all the frames of the video shot will be blurred. In this circumstance, in a further embodiment, a demarcation frame 704 can be positioned in the image 100, centered on the racing car, and then the gradient can be calculated over the frame 704 rather than over the entire image 100. This gives a more effective selection of frames since additional weight is given to the particular visual image (i.e. the racing car inside demarcation frame 704) within the image frame 100 which is of interest. The width and height of the demarcation frame 704 are M' and N' respectively, and the aforementioned gradient calculation equation takes the following form:

$$G(t)=\Sigma_i\Sigma_j G_c/M'N'$$

where:

M' and N' are the width 706 and the height 708 of the demarcation frame 704 t is the frame number i=0, 1, 2, . . . , N'−1 j−0, 1, 2, . . . , M'−1

In yet a further embodiment, the image region falling within the demarcation frame can be spatially weighted in order to provide a differential gradient contribution effect across the demarcation frame, as shown for a demarcation frame 710. In this case, the demarcation frame 710 has a width 714 given by M" and a height 716 given by N", and the gradient value calculation can be expressed mathematically as follows:

$$G(t)=\Sigma_i\Sigma_j W_{ij}G_c/M''N''$$

where:

M" and N" are the width 714 and the height 716 of the frame 710 t is the frame number i=0, 1, 2, . . . , N"−1 j−0, 1, 2, . . . , M"−1

$W_{ij}$ is the weight assigned as a function of pixel position within the demarcation frame.

The method described provides a simple process with relatively low computation load which can be applied to video shots 102 to enable preferably automatic frame selection for printing, storing, or flagging frames which are suitable for printing. The list of frames for printing 114 may be used as a summary description, for example, of the set of frames selected for printing.

The foregoing describes only particular embodiments of the present invention, and modifications and/or changes can be made thereto without departing from the scope and spirit of the present invention.

What is claimed is:

1. A method for identifying one or more image frames from a series of video image frames for printing, storing or flagging, the method including the steps of:

a) calculating, for each image frame in the series, a single scalar gradient value characterizing said each image frame, thereby to generate a raw data series;

b) smoothing data within the raw data series to generate a smoothed data series;

c) identifying one or more local maxima in the smoothed data series;

d) identifying one or more gradient value peaks in a corresponding range of the raw data series based on positions of respective local maxima; and e) selecting the image frames corresponding to each of the identified gradient value peaks.

2. A method according to claim 1, wherein the gradient value peaks identified in step (d) are in the vicinity of each local maximum.

3. A method according claim 1, wherein step (d) includes the sub-steps of:

f) defining a gradient value threshold; and g) for each set of peaks with a least one peak exceeding the threshold value, selecting a maximum peak.

4. A method according to claim 1, wherein step (d) includes the sub-steps of:

h) where said maxima are positioned remote from each other in the series, selecting points in the smoothed data series between adjacent local maxima; and i) identifying one or more peaks in the raw data series in a vicinity of each selected point.

5. A method according to claim 4, wherein step (i) includes the sub-steps of:

j) defining a gradient value threshold; and k) for each set of peaks with at least one peak exceeding the threshold value, selecting a maximum peak.

6. A method according to claim 5, wherein the method further includes the steps of:

l) printing, displaying or storing the selected image frames; and/or m) printing, displaying or storing a frame list associated with the selected image frames.

7. A method according to claim 4, whereby the selected points are selected on the basis of predetermined time intervals.

8. A method according to claim 4, whereby the selected points are selected on the basis of a rate of change of the smoothed data series between the adjacent maxima.

9. A method according to claim 1, whereby the gradient value is calculated over a region in the image.

10. A method according to claim 9, whereby the gradient value calculated is dependent upon weights which are assigned to pixels in the region.

11. A method of identifying one or more image frames from a series of image frames, the method including the steps of:

n) calculating, for each image frame in the series a single scalar gradient value characterizing said each image frame, thereby to generate a raw data series;

o) defining a gradient value threshold;

p) identifying sets of adjacent gradient values in the raw data series which exceed the gradient value threshold and are of similar value; and q) selecting a representative image frame from each set of adjacent gradient values.

12. An apparatus for identifying one or more image frames from a series of video image frames for printing, storing or flagging, the apparatus comprising:

gradient calculation means arranged to receive a series of image frames and to calculate for each image frame in the series, a single scalar gradient value, and output a raw data series of scalar gradient values, one gradient value characterizing said each frame;

data smoothing means responsive to the raw data series and arranged to generate and output a smoothed data series;

identification means responsive to the smoothed data series and arranged to identify and output one or more local maxima in the smoothed data series;

gradient peak selection means responsive to the one or more local maxima and to the raw data series and arranged to identify one or more gradient value peaks in a corresponding range of the raw data series based upon positions of respective local maxima; and image frame selection means responsive to the series of image frames and to the identified gradient value peaks, and arranged to select image frames corresponding to each of the identified gradient value peaks.

13. An apparatus according to claim 12, wherein the gradient peak selection means are arranged to identify gradient value peaks in the vicinity of each local maximum.

14. An apparatus according to claim 12, wherein the gradient peak selection means are arranged to define a gradient value threshold, and for each set of peaks with a least one peak exceeding the threshold value, to select a maximum peak.

15. An apparatus according to claim 12, wherein where said maxima are positioned remote from each other in the series, the gradient peak selection means are arranged to select points in the smoothed data series between adjacent local maxima, and to identify one or more peaks in the raw data series in a vicinity of each selected point.

16. An apparatus according to claim 15, wherein the means to identify one or more peaks in the raw data series in a vicinity of each selected point are further arranged to define a gradient value threshold, and for each set of peaks with at least one peak exceeding the threshold value, to select a maximum peak.

17. An apparatus according to claim 15, wherein the gradient peak selection means are further arranged to select the selected points on the basis of predetermined time intervals.

18. An apparatus according to claim 15, wherein the gradient peak selection means are further arranged to select the selected points on the basis of a rate of change of the smoothed data series between the adjacent maxima.

19. An apparatus according to claim 12, the apparatus further including means for printing, displaying or storing the selected image frames.

20. An apparatus according to claim 12, the apparatus further including means for printing, displaying or storing a frame list associated with the selected image frames.

21. An apparatus according to claim 12, wherein the gradient calculation means are further arranged to calculate the gradient value over a region in the image.

22. An apparatus according to claim 21, wherein the gradient calculation means are further arranged to calculate the gradient value dependent upon weights which are assigned to pixels in the region.

23. An apparatus for identifying one or more image frames from a series of image frames, the apparatus comprising:

means for calculating, for each image frame in the series, a single scalar gradient value characterizing said each image frame, thereby to generate a raw data series;

means for defining a gradient value threshold;

means for identifying sets of adjacent gradient values in the raw data series which exceed the gradient value threshold and are of similar value; and means for selecting a representative image frame from each set of adjacent gradient values.

24. An apparatus for identifying one or more image frames from a series of video images for printing, storing or flagging, the apparatus comprising:

gradient calculation means arranged to receive a series of image frames and to calculate, for each image frame in the series, a single scalar gradient value, and output a corresponding series of scalar gradient values characterizing the image frames;

data smoothing means responsive to the series of gradient values for generating a smoothed data series; and image frame selection means responsive to the smoothed data series for selecting image frames.

25. A computer program product including a computer readable medium having recorded thereon a computer program for identifying one or more image frames from a series of video image frames for printing, storing or flagging, the computer program comprising:

gradient calculation process steps arranged to receive a series of image frames and to calculate, for each image frame in the series, a single scalar gradient value, and output a raw data series of scalar gradient values, one gradient value characterizing said each frame;

data smoothing process steps responsive to the raw data series and arranged to generate and output a smoothed data series;

identification process steps responsive to the smoothed data series and arranged to identify and output one or more local maxima in the smoothed data series;

gradient peak selection process steps responsive to the one or more local maxima and to the raw data series and arranged to identify one or more gradient value peaks in a corresponding range of the raw data series based upon positions of respective local maxima; and image frame selection process steps responsive to the series of image frames and to the identified gradient value peaks, and arranged to select image frames corresponding to each of the identified gradient value peaks.

26. A computer program product according to claim 25, wherein the gradient peak selection process steps identify the one or more gradient value peaks based upon positions of respective local maxima.

27. A computer program product according to claim 25, wherein the gradient peak selection process steps define a gradient value threshold, and for each set of peaks with a least one peak exceeding the threshold value, select a maximum peak.

28. A computer program product according to claim 25, wherein the gradient peak selection process steps include the sub-steps of:

where said maxima are positioned remote from each other in the series, selecting points in the smoothed data series between adjacent local maxima; and identifying one or more peaks in the raw data series in a vicinity of each selected point.

29. A computer program product according to claim 28, wherein the point selection process steps include the sub-steps of:

defining a gradient value threshold; and for each set of peaks with at least one peak exceeding the threshold value, selecting a maximum peak.

30. A computer program product according to claim 28, wherein the point selection process steps select the selected points on the basis of predetermined time intervals.

31. A computer program product according to claim 28, wherein the point selection process steps select the selected points on the basis of a rate of change of the smoothed data series between the adjacent maxima.

32. An computer program product according to claim 25, wherein the computer program further includes the steps of:

printing, displaying or storing the selected image frames.

33. A computer program product according to claim 25, wherein the computer program further includes the steps of:

printing, displaying or storing a frame list associated with the selected image frames.

34. A computer program product according to claim 25, whereby the gradient value calculation steps are performed over a region in the image.

35. A computer program product according to claim 34, whereby the gradient value calculation steps are dependent upon weights which are assigned to pixels in the region.

36. A computer program product including a computer readable medium having recorded thereon a computer program for identifying one or more image frames from a series of video image frames for printing, storing or flagging, the computer program comprising:

process steps for calculating, for each image frame in the series, a single scalar gradient value characterizing said each image frame, thereby to generate a raw data series;

process steps for defining a gradient value threshold;

process steps for identifying sets of adjacent gradient values in the raw data series which exceed the gradient value threshold and are of similar value; and process steps for selecting a representative image frame from each set of adjacent gradient values.

* * * * *